United States Patent
Choi et al.

(10) Patent No.: US 9,041,783 B2
(45) Date of Patent: May 26, 2015

(54) SHUTTER GLASSES, DISPLAY APPARATUS AND CONTROL METHOD THEREOF

(75) Inventors: Nak-won Choi, Incheon (KR); Jung-jin Park, Seongnam-si (KR); Tae-hyeun Ha, Suwon-si (KR); Jong-kil Kwak, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 829 days.

(21) Appl. No.: 13/011,181

(22) Filed: Jan. 21, 2011

(65) Prior Publication Data

US 2011/0205345 A1    Aug. 25, 2011

Related U.S. Application Data

(60) Provisional application No. 61/307,996, filed on Feb. 25, 2010.

(30) Foreign Application Priority Data

Apr. 14, 2010 (KR) .......................... 10-2010-0034119

(51) Int. Cl.
*H04N 13/04* (2006.01)

(52) U.S. Cl.
CPC ....... *H04N 13/0497* (2013.01); *H04N 13/0438* (2013.01); *H04N 2213/008* (2013.01)

(58) Field of Classification Search
CPC .......... H04N 13/0438; H04N 13/0497; H04N 2213/008
See application file for complete search history.

(56) References Cited

U.S. PATENT DOCUMENTS

| | | | | |
|---|---|---|---|---|
| 5,821,989 A | * | 10/1998 | Lazzaro et al. | 348/56 |
| 6,141,357 A | | 10/2000 | Testani et al. | |
| 2001/0043266 A1 | | 11/2001 | Robinson et al. | |
| 2009/0051759 A1 | | 2/2009 | Adkins et al. | |
| 2009/0237327 A1 | | 9/2009 | Park et al. | |
| 2010/0302354 A1 | * | 12/2010 | Jung | 348/58 |

OTHER PUBLICATIONS

Communication dated Dec. 16, 2013 issued by the European Patent Office in European Patent Application No. 11154634.7.

* cited by examiner

*Primary Examiner* — Andy Rao
*Assistant Examiner* — Tyler Edwards
(74) *Attorney, Agent, or Firm* — Sughrue Mion, PLLC (57) ABSTRACT

The shutter glasses for the display apparatus include a shutter-glasses communication unit which receives a first sync signal from the display apparatus displaying a three-dimensional (3D) image; and a shutter-glasses controller which generates an ON/OFF driving signal for a left-eye lens unit and a right-eye lens unit of the shutter glasses based on the first sync signal, the first sync signal including a pattern, based on which at least one sync pulse is periodically omitted in a second sync signal used in displaying the 3D image according to a frame driving frequency of the 3D image. The shutter-glasses controller generates an ON/OFF driving signal in sync with the first sync signal, so that the ON/OFF driving signal includes the sync pulse in a section corresponding to the omitted sync pulse of the second sync signal according to a time period of the first sync signal.

38 Claims, 6 Drawing Sheets

FIG. 6 ic # SHUTTER GLASSES, DISPLAY APPARATUS AND CONTROL METHOD THEREOF

CROSS-REFERENCE TO RELATED PATENT APPLICATIONS

This application claims priority from U.S. Provisional Application No. 61/307,996, filed Feb. 25, 2010, and Korean Patent Application No. 10-2010-0034119, filed Apr. 14, 2010 in the Korean Intellectual Property Office, the disclosures of which are incorporated herein by reference in their entireties.

BACKGROUND

1. Field

Apparatuses and methods consistent with exemplary embodiments relate to shutter glasses that operate to selectively transmit light corresponding to a three-dimensional (3D) image, a display apparatus and a control method thereof.

2. Description of the Related Art

A display apparatus processes a video signal input from a video source and displays the processed video signal as an image on a display panel such as a liquid crystal display (LCD) or the like. The display apparatus scans scan lines, which contain video information, to the display panel to display an image. One video frame is formed as the scan lines are sequentially scanned on the display panel.

An image displayed by the display apparatus may be a two-dimensional (2D) image and a 3D image according to its characteristics. Human eyes have different view angles and thus recognize an object in three dimensions. Accordingly, a displayed 3D image is displayed divided into a left-eye image and a right-eye image. The display system uses 3D glasses capable of selectively transmitting light with regard to user's eyes. The 3D glasses may be achieved by shutter glasses that selectively transmit light according to voltage supply, or polarized glasses that transmit light in a preset polarized direction.

In the case that the 3D glasses are the shutter glasses, the display apparatus generates a sync signal corresponding to a displayed 3D image and transmits the sync signal to the shutter glasses. The shutter glasses operate in response to the received sync signal to thereby selectively transmit the image with regard to user's eyes.

However, the transmitted sync signal may interfere with other electronic devices. Additionally, other devices may interfere with the sync signal. This may result in some pulses being omitted from the sync signal received by the shutter glasses.

SUMMARY

Exemplary embodiments address at least the above problems and/or disadvantages and other disadvantages not described above. Also, an exemplary embodiment is not required to overcome the disadvantages described above, and an exemplary embodiment may not overcome any of the problems described above.

According to an aspect of an exemplary embodiment, there is provided shutter glasses for a display apparatus, including: a shutter-glasses communication unit which receives a first sync signal from the display apparatus displaying a 3D image; and a shutter-glasses controller which generates an ON/OFF driving signal for a left-eye lens unit and a right-eye lens unit of the shutter glasses on the basis of the first sync signal, the first sync signal including a pattern where at least one sync pulse is periodically omitted in a second sync signal used in displaying the 3D image according to a frame driving frequency of the 3D image, and the shutter-glasses controller generating an ON/OFF driving signal in sync with the first sync signal, and predicting and generating the ON/OFF driving signal in a section corresponding to the omitted sync pulses according to a time period of the first sync signal.

The shutter-glasses controller may control the ON/OFF driving signal to adjust light transmittance of the left-eye lens unit and the right-eye lens unit on the basis of the pattern.

The light transmittance may be adjusted depending on a duty width of the ON driving signal for the left-eye lens unit and the right-eye lens unit.

The first sync signal may include a pattern where a queue of carrier pulses is periodically repeated.

The queue of the carrier pulses may include consecutive 2 through 5 pulses.

The shutter-glasses controller may determine whether the sync signal is normal or whether there is noise on the basis of a sync pulse width of the first sync signal.

According to an aspect of another exemplary embodiment, there is provided shutter glasses operating corresponding to a display apparatus displaying a 3D image, the shutter glasses including: a shutter-glasses communication unit which communicates with the display apparatus; a lens unit which operates to selectively transmit light; and a shutter-glasses controller which converts a first sync signal into a shutter-control sync signal, of which a sync corresponding to timing of displaying the 3D image in the display apparatus is corrected, on the basis of a preset waveform if the shutter-glasses communication unit receives the first sync signal having the preset waveform, and operates the lens unit on the basis of the shutter-control sync signal.

The first sync signal may include the preset waveform of which at least one sync is omitted according to a preset sync pattern among the syncs corresponding to timing of displaying the 3D image, and the shutter-glasses controller may analyze the sync pattern of the first sync signal and converts the first sync signal into the shutter-control sync signal by restoring the omitted sync on the basis of the analyzed sync pattern.

At least some syncs of the first sync signal may be omitted among the syncs corresponding to timing of displaying a frame of the 3D image including left-eye image field and right-eye image field displayed in the display apparatus, or corresponding to timing of displaying the fields.

A plurality of sync patterns may be previously set, and the shutter-glasses controller may select one sync pattern corresponding to the first sync signal among the plurality of sync patterns when converting the first sync signal into the shutter-control sync signal.

The shutter-glasses controller may select one operation mode corresponding to the sync pattern of the first sync signal among operation modes for operating the lens unit, and operate the lens unit in the selected operation mode on the basis of the shutter-control sync signal.

The operation modes may be divided according to light transmittance of the lens unit.

The shutter-glasses controller may monitor a change in a waveform of the first sync signal received in the shutter-glasses communication unit, and implement the operation mode corresponding to the changed waveform.

The shutter-glasses controller may implement the operation mode in real time corresponding to the change in the waveform. According to an aspect of another exemplary embodiment, there is provided a display apparatus displaying a 3D image and including shutter glasses operating corresponding to the displayed 3D image, the display apparatus including: a video receiver which receives a video signal; a video processor which processes a video signal received in the video receiver to be displayed as an image; a display unit which displays a video signal processed by the video processor as an image; a display-apparatus communication unit which communicates with the shutter glasses; and a display-apparatus controller which generates a first sync signal having a preset waveform when displaying a 3D image on the display unit, and transmits the first sync signal to the shutter glasses through the display-apparatus communication unit so that the shutter glasses convert the first sync signal into a shutter-control sync signal, of which a sync corresponding to timing of displaying the 3D image in the display apparatus is corrected, on the basis of the preset waveform and operates on the basis of the shutter-control sync signal.

The first sync signal may include the preset waveform where at least some syncs are omitted depending on a preset sync pattern among the syncs corresponding to timing of displaying the 3D image.

At least some syncs of the first sync signal may be omitted among the syncs corresponding to timing of displaying a frame of the 3D image including left-eye image field and right-eye image field, or corresponding to timing of displaying the fields.

A plurality of the sync patterns may be provided, and the display-apparatus controller may select one among the sync patterns when generating the first sync signal.

The display-apparatus controller may select one among operation modes for operating the shutter glasses on the basis of characteristics of a video signal received in the video receiver, and select the sync pattern corresponding to the selected operation mode.

The operation modes may be divided according to light transmittance of the lens unit.

The display-apparatus controller may select the operation mode according to respective sync periods corresponding timing of displaying the 3D image.

According to an aspect of another exemplary embodiment, there is provided a method of controlling shutter glasses that include a lens unit operating to selectively transmit light and operate the lens unit corresponding to a display apparatus displaying a 3D image, the method including receiving a first sync signal having a preset waveform from the display apparatus; converting the first sync signal into a shutter-control sync signal, of which a sync corresponding to timing of displaying the 3D image in the display apparatus is corrected, on the basis of the preset waveform; and operating the lens unit on the basis of the shutter-control sync signal.

The first sync signal may include a preset waveform where at least some syncs are omitted depending on a preset sync pattern among the syncs corresponding to timing of displaying the 3D image, and the converting the first sync signal into the shutter-control sync signal may include analyzing the sync pattern from the first sync signal; and restoring the omitted sync of the first sync signal on the basis of the analyzed sync pattern.

At least some syncs of the first sync signal may be omitted among the syncs corresponding to timing of displaying a frame of the 3D image including left-eye image field and right-eye image field, or corresponding to timing of displaying the fields.

The analyzing the sync pattern may include selecting one sync pattern corresponding to the first sync signal among a plurality of sync patterns.

The selecting the one sync pattern may include selecting one operation mode corresponding to the preset sync pattern among operation modes for operating the lens unit, and the operating the lens unit on the basis of the shutter-control sync signal may include operating the lens unit in the selected operation mode.

The operation modes may be divided according to light transmittance of the lens unit.

The selecting the one operation mode may include monitoring a change in a sync pattern of the first sync signal received from the display apparatus, and the operating the lens unit in the selected operation mode may include operating the lens unit in the operation mode corresponding to the changed sync pattern.

According to an aspect of another exemplary embodiment, there is provided a method of controlling a display apparatus displaying a 3D image and including shutter glasses operating corresponding to the displayed 3D image, the method including: displaying a 3D image; generating a first sync signal having a preset waveform corresponding to display of a 3D image; and transmitting the first sync signal to the shutter glasses so that the shutter glasses convert the first sync signal into a shutter-control sync signal, of which a sync corresponding to timing of displaying the 3D image is corrected, on the basis of the preset waveform and operates on the basis of the shutter-control sync signal.

The first sync signal may include the preset waveform where at least some syncs are omitted depending on a preset sync pattern among the syncs corresponding to timing of displaying the 3D image.

At least some syncs of the first sync signal may be omitted among the syncs corresponding to timing of displaying a frame of the 3D image including left-eye image field and right-eye image field, or corresponding to timing of displaying the fields.

The generating the first sync signal may include selecting one of a plurality of the sync patterns.

The selecting one among the plurality of sync patterns may include selecting one among plural operation modes for operating the shutter glasses on the basis of characteristics of a video signal received in the display apparatus; and selecting the sync pattern corresponding to the selected operation mode.

The operation modes may be divided according to light transmittance of the lens unit.

The selecting one among the operation modes may include selecting the operation mode according to respective sync periods corresponding timing of displaying the 3D image.

BRIEF DESCRIPTION OF THE DRAWINGS

The above and/or other aspects will become apparent by describing certain exemplary embodiments, with reference to the accompanying drawings, in which.

DETAILED DESCRIPTION OF EXEMPLARY EMBODIMENTS

Certain exemplary embodiments are described in greater detail with reference to accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters.

Figure 1:
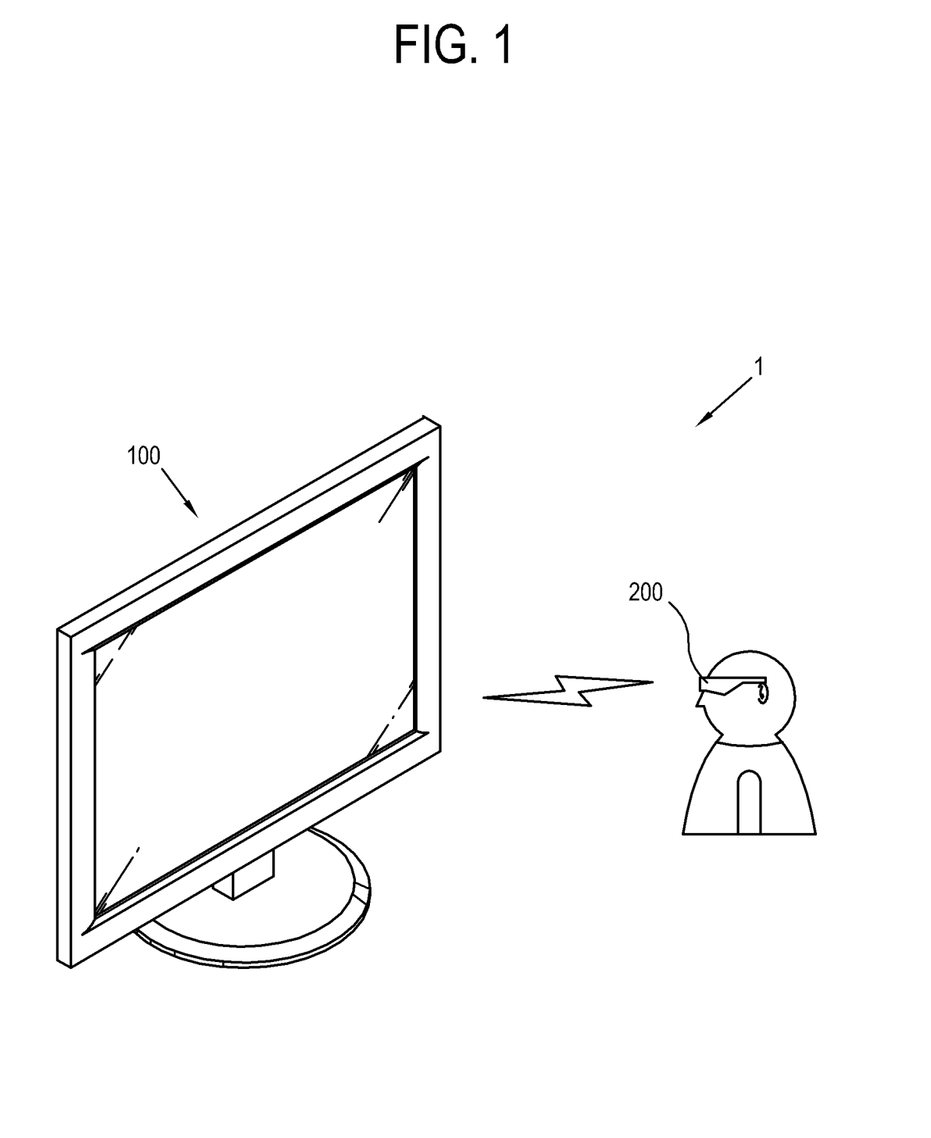
FIG. 1 shows an example of a display system according to an exemplary embodiment.

FIG. 1 shows an example of the display system 1 according to an exemplary embodiment.

As shown in FIG. 1, the display system 1 includes a display apparatus 100 that processes a video signal received from an external source and displays it as an image, and shutter glasses 200 that selectively transmit or block light in response to an image displayed in the display apparatus 100 if the image is a 3D image.

The display apparatus 100 may receive a video signal from various external video sources such as a computer (not shown) that generates and locally provides a video signal with a central processing unit and a graphic card (not shown), a server (not shown) that provides a video signal through a network, a broadcasting transmitter (not shown) that transmits a broadcast signal through airwaves or a cable, etc.

The display apparatus 100 receives a 2D video signal or a 3D video signal from an external source and processes it to be displayed as an image. As opposed to the 2D image, the 3D image includes a left-eye image field corresponding to a user's left eye, and a right-eye image field corresponding to a user's right eye. When receiving a 3D video signal, the display apparatus 100 in this exemplary embodiment displays the left-eye image field and the right-eye image field alternately on the basis of the 3D video signal.

In the case that the display apparatus 100 displays a 3D image, the shutter glasses 200 selectively open or shut a view of a user's left or right eye according to which one of the left-eye image field and the right-eye image field is currently displayed. That is, if the display apparatus 100 is displaying the left-eye image field, the shutter glasses 200 open the view of the left eye and shut the view of the right eye. On the other hand, if the display apparatus 100 is displaying the right-eye image field, the shutter glasses 200 open the view of the right eye and shut the view of the left eye.

To synchronize an image displayed in the display apparatus 100 with the operation of the shutter glasses 200, the display apparatus 100 generates a sync signal corresponding to timing of displaying an image and sends the sync signal to the shutter glasses 200. The shutter glasses 200 operate on the basis of the received sync signal.

Elements of the display apparatus 100 and the shutter glasses 200 are described in detail below with reference to FIG. 2. In particular, FIG. 2 shows a control block diagram of the display apparatus 100 and the shutter glasses 200.

Figure 2:
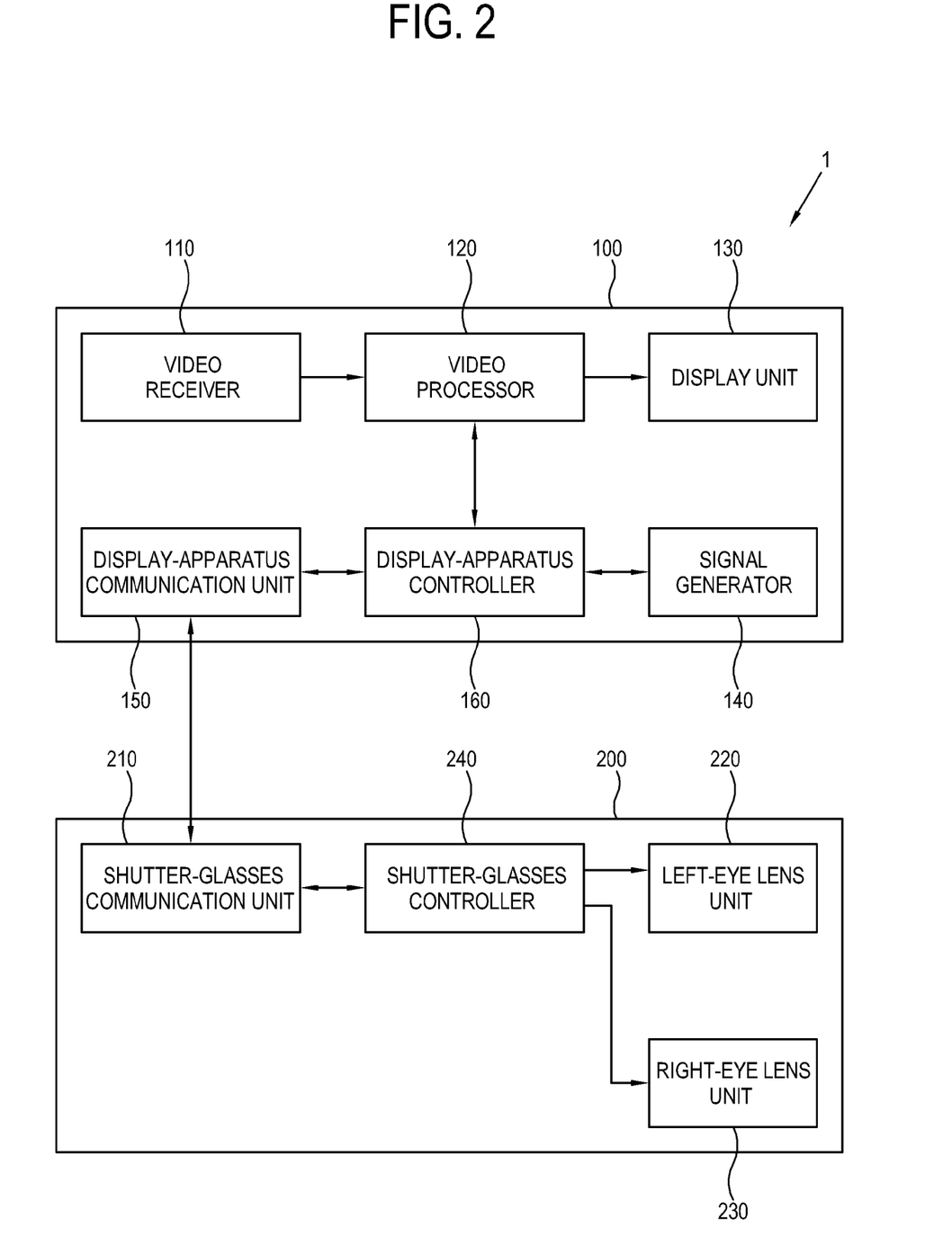
FIG. 2 shows a control block diagram of the display system of FIG. 1.

As shown in FIG. 2, the display apparatus 100 includes a video receiver 110 to receive a video signal, a video processor 120 to process a video signal received by the video receiver 110, a display unit 130 to display a video signal processed by the video processor 120 as an image, a signal generator 140 to generate a driving signal for the 3D image in the case that the 3D image is displayed on the display unit 130, a display-apparatus communication unit 150 to communicate with the shutter glasses 200 so that the driving signal generated by the signal generator 140 is sent to the shutter glasses 200, and a display-apparatus controller 160 controlling operation of these elements.

Further, the shutter glasses 200 include a shutter-glasses communication unit 210 to communicate with the display apparatus communication unit 150 and receive a sync signal, a left-eye lens unit 220 and a right-eye lens unit 230 to transmit light with regard to a user's left eye and user's right eye, respectively, and a shutter-glasses controller 240 to control the left-eye and right-eye lens units 220 and 230 to operate on the basis of the sync signal received by the shutter-glasses communication unit 210.

With this configuration, the display-apparatus controller 160 in the present exemplary embodiment generates a sync signal having a preset waveform when a 3D image is displayed on the display unit 130, and sends it to the shutter glasses 200. The waveform of the sync signal includes a sync or a sync pulse corresponding to the timing of displaying a 3D image, i.e., at least one sync pulse of an ON signal, an enable signal, and a carrier pulse is periodically omitted according to preset sync patterns.

The shutter-glasses controller 240 analyzes the waveform of the sync signal received from the display apparatus 100, and restores the omitted sync pulses in the sync signal on the basis of the analyzed waveform, thereby generating an ON/OFF driving signal. The shutter-glasses controller 240 controls the operation of the left-eye lens unit 220 and the right-eye lens unit 230 in response to the generated ON/OFF driving signal.

By omitting sync pulses from the sync signal, a frequency of the sync signal transmitted from the display apparatus 100 to the shutter glasses 200 is lowered to decrease communication interference with other electronic devices and to reduce power consumption. The omitted sync pulses are restored by the shutter glasses 200, so that the shutter glasses 200 can operate normally even though noise or the like error may cause some loss in the sync pulses.

Elements of the display apparatus 100 is described in detail below.

The video receiver 110 receives a video signal and outputs it to the video processor 120, which may include components to perform various processing according to formats of a video signal to be received and types of the display apparatus 100.

For example, if the display apparatus 100 is a television, the video receiver 110 may wirelessly receive a radio frequency signal from a broadcasting station (not shown), or use a wire to receive a video signal based on standards such as composite video, component video, super video, Syndicat des Constructeurs des Appareils Radiorécepteurs et Téléviseurs (SCART), high definition multimedia interface (HDMI), etc. If the video signal is a broadcast signal, the video receiver 110 includes a tuner tuned to channels to receive the broadcast signal.

If the display apparatus 100 is a monitor for a computer, the video receiver 110 may include components to perform processing according to various standards such as D-Sub for transmitting red/green/blue (RGB) signals based on video graphic array (VGA); a digital video interactive analog (DVI-A), a digital video interactive integrated digital/analog (DVI-I), a digital video interactive digital (DVI-D) based on DVI; HDMI; etc. Also, the video receiver 110 may include a display port, a unified display interface (UDI), or a wireless high definition (HD), etc.

The video processor 120 performs various preset processes with regard to a video signal. The video processor 120 implements these processes and outputs a video signal to the display unit 130, to display an image on the display unit 130.

There is no limit to the kinds of processes to be performed by the video processor 120. For example, the processes may include decoding and encoding corresponding to various video formats, de-interlacing, frame refresh rate conversion, scaling, noise reduction for improving picture quality, detail enhancement, line scanning, etc. The video processor 120 may include an individual components capable of independently processing these processes, and/or integrated components where various functions are integrated.

The video processor 120 processes a video signal for a plurality of horizontal scan lines according to frames and scans the video signal on the display unit 130. The video processor 120 scans an image from an upper side to a lower side at a display area of the display unit 130. When an image of one frame is completely scanned, an image of the next frame is scanned after a lapse of a preset non-scan time period.

The video processor 120 alternately scans video signals respectively corresponding to the left-eye field and right-eye video field on the display unit 130 if receiving a video signal corresponding to a 3D image from the video receiver 110. Thus, the left-eye video field and the right-eye video field are alternately displayed on the display unit 130 during the non-scan period.

The display unit 130 may be include an LCD panel as an example, but not limited thereto. The display unit 130 displays an image based on a video signal processed by the video processor 120. For example, the plurality of horizontal scan lines scanned by the video processor 120 is vertically arranged, so that a video frame or a video field is displayed on the display unit 130.

Under control of the display-apparatus controller 160, the signal generator 140 generates a sync signal synchronized with the timing of displaying a 3D image on the display unit 130 and transmits the sync signal to the display-apparatus communication unit 150.

Under control of the display-apparatus controller 160, the display-apparatus communication unit 150 transmits the sync signal from the signal generator 140 to the shutter glasses 200 at proper timing. The display-apparatus communication unit 150 may use various formats such as infrared rays, visible rays, ultraviolet rays or the like to transmit the sync signal.

The display-apparatus controller 160 generates a first sync signal synchronized with timing of displaying a video frame according to driving frequencies of a 3D video frame displayed on the display unit 130. The display-apparatus controller 160 converts the first sync signal into a second sync signal having a preset waveform, and controls the second sync signal to be transmitted via the display-apparatus communication unit 150. Here, the "first sync signal" and the "second sync signal" are used for convenience of the description without restricting an exemplary embodiment.

A method of converting the first sync signal into the second sync signal in the display-apparatus controller 160 is described in detail below. In the first sync signal corresponding to a 3D image, sync pulses respectively corresponding to display timings of video frames appear in the form of time series. For example, a sync pattern or a plurality of sync patterns is set in advance in the display-apparatus controller 160 so that some sync pulses can be omitted according to time intervals among the plurality of sync pulses included in the first sync signal.

Light transmittance of the left-eye and right-eye lens units 220 and 230 in the shutter glasses 200 is varied depending on the characteristics of the video signal received in the video receiver 110, based on the standards of a video signal such as a national television system committee (NTSC), a phase alternating line (PAL), etc. or each sync period corresponding to the display timing of a 3D image, i.e. a temporal periodic width of the sync pulse. This is to prevent cross-talk that may occur according to display images.

The shutter glasses 200 have a plurality of operation modes to operate with different light transmittances according to the characteristics of the video signal received in the display apparatus 100. The plurality of sync patterns provided in the display-apparatus controller 160 respectively corresponds to the plurality of operation modes of the shutter glasses 200.

The display-apparatus controller 160 selects an operation mode from the plurality of operation modes of the shutter glasses 200 according to the characteristics of the video signal received in the video receiver 110. The display-apparatus controller 160 selects a sync pattern corresponding to the selected operation mode, from the plurality of preset sync patterns.

The display-apparatus controller 160 converts the first sync signal into the second sync signal by omitting some sync pulses on the basis of the selected sync pattern among the sync pulses arranged by a predetermined period in the form of time series. The display-apparatus controller 160 transmits the second sync signal to the shutter glasses 200 via the display-apparatus communication unit 150.

In an exemplary embodiment, the sync pulses of the first sync signal corresponds to the display timing of each video frame, but not limited thereto. For example, the sync pulses of the first sync signal may correspond to the display timing of each of the left-eye field and right-eye image field, in which the sync pulses respectively corresponding to the display timing of the left-eye field and right-eye image field are provided to be different in width, thereby distinguishing the respective fields.

The shutter-glasses communication unit 210, provided corresponding to the communication standards of the display-apparatus communication unit 150, receives the second sync signal from the display-apparatus communication unit 150 and transmits the second sync signal to the shutter-glasses controller 240.

The left-eye lens unit 220 and the right-eye lens unit 230 selectively transmit or block light under control of the shutter-glasses controller 240. Thus, the left-eye lens unit 220 and the right-eye lens unit 230 selectively perform the light transmittance with respect to user's left and right eyes, so that a user can recognize left-eye and right-eye images, displayed on the display unit 130, through the left and right eyes, respectively.

The left-eye lens unit 220 and the right-eye lens unit 230 may include a liquid crystal lens that blocks light when receiving voltage from the shutter-glasses controller 240 and transmits light when receiving no voltage, but not limited thereto. Alternatively, the left-eye lens unit 220 and the right-eye lens unit 230 may transmit light when receiving voltage and block light when receiving no voltage. Also, the left-eye lens unit 220 and the right-eye lens unit 230 may have different light transmittances according to levels of applied voltage levels.

The shutter-glasses controller 240 analyzes a waveform of the second sync signal received by the shutter-glasses communication unit 210, and determines to which of the plurality of preset waveforms the received waveform corresponds. The preset waveform may be associated with or correspond to a corresponding operation mode. In this exemplary embodiment, the preset waveform indicates a sync pattern in which some sync pulses are periodically omitted among sync pulses corresponding to display timing of a 3D image.

That is, the shutter-glasses controller 240 selects a preset sync pattern corresponding to a sync pattern of the second sync signal. On the basis of a selection result, the shutter-glasses controller 240 generates an ON/OFF driving signal, such as a shutter-control sync signal by restoring the omitted sync pulses in the second sync signal, and selects an operation mode of the shutter glasses 200.

The shutter-glasses controller 240 operates the left-eye lens unit 220 and the right-eye lens unit 230 at the selected operation mode in response to the shutter-control sync signal. The shutter-glasses controller 240 synchronizes timing of operating the left-eye and right-eye lens units 220 and 230 with the restored sync pulses of the second sync signal, thereby correcting a timing error between the second sync signal and the ON/OFF signal.

An example of converting the second sync signal transmitted from the display apparatus 100 into the ON/OFF signal in the shutter glasses 200 is described in detail below with reference to FIG. 3.

Figure 3:
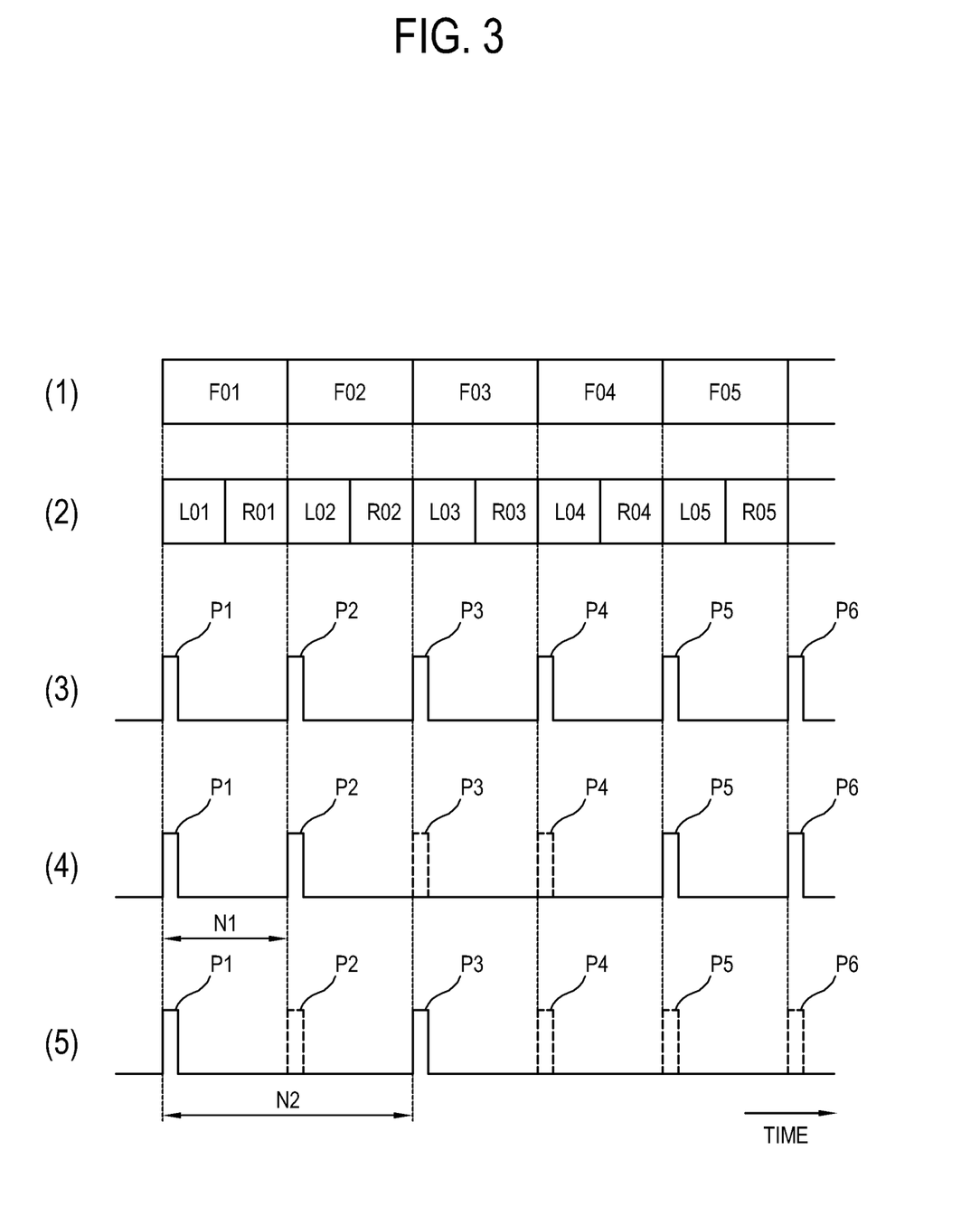
FIG. 3 shows an example of sync signals reflecting sync patterns corresponding to respective operation modes of shutter glasses.

FIG. 3 shows an example of sync signals corresponding to display timing of 3D video frames and fields. In FIG. 3, an abscissa indicates a lapse of time.

Area (1) of FIG. 3 denotes video frames F01, F02, F03, F04, and F05 which are displayed in sequence.

Area (2) of FIG. 3 denotes display of left-eye and right-eye video fields included in each video frame. For example, the video frame F01 includes a left-eye image field L01 and a right-eye image field R01, in which the left-eye image field L01 is displayed prior to the right-eye image field R01. As shown in area (2) of FIG. 3, if five video frames are considered, five left-eye image fields and five right-eye fields are displayed alternately.

Area (3) of FIG. 3 denotes the first sync signal containing sync pulses P1, P2, P3, P4, P5, and P6 corresponding to the display timing of each video frame. The first sync signal is generated by the signal generator 140 when the display apparatus 100 processes a video signal.

If in a first operation mode the shutter glasses 200 have a light transmittance of 100% and in a second operation mode a light transmittance of 80%, the display-apparatus controller 160 sets in advance a first sync pattern corresponding to the first operation mode and a second sync pattern corresponding to the second operation mode.

Area (4) of FIG. 3 denotes the second sync signal converted from the first sync signal according to the first sync pattern. The display-apparatus controller 160 selects the first sync pattern when determining that the shutter glasses 200 have to operate in the first operation mode according to the characteristics of a video signal. Then, the display-apparatus controller 160 generates the second sync signal by omitting some sync pulses P3 and P4 from the first sync signal on the basis of the first sync pattern, and transmits the second sync signal to the shutter glasses 200.

The shutter-glasses controller 240 analyzes the sync pattern of the received second sync signal and determines that the sync pulses P3 and P4 are omitted among the sync pulses P1 through P6. The shutter-glasses controller 240 selects the first operation mode corresponding to the received sync pattern of the second sync signal, and generates the ON/OFF signal by restoring the omitted sync pulses P3 and P4. The generated ON/OFF signal has timing corresponding to area (1) of FIG. 3.

In the shutter-glasses controller 240, determining which sync pulses are omitted among the sync pulses P1 through P6 may be achieved by calculating a period N1 between two adjacent sync pulses P1 and P2, and deriving a sync pattern corresponding to the period N1. However, this is only an example, and various methods may be applied according to various criteria.

Area (5) of FIG. 3 denotes a third sync signal converted from the first sync signal according to the second preset sync pattern.

The display-apparatus controller 160 selects the second sync pattern different from the first sync pattern when it is determined that the shutter glasses 200 are to operate in the second operation mode according to the characteristics of a video signal. The display-apparatus controller 160 omits some sync pulses such as sync pulses P2, P4, P5, and P6 according to the second sync pattern. That is, the sync signals respectively converted according to the sync patterns are different in an omission pattern of the sync pulse. The display-apparatus controller 160 transmits the generated third sync signal to the shutter glasses 200.

The shutter-glasses controller 240 analyzes the sync pattern of the received third sync signal and determines that the sync pulses P2, P4, P5 and P6 are omitted among the sync pulses P1 through P6. For example, the shutter-glasses controller 240 calculates a period N2 between two adjacent sync pulses P1 and P3, and analyzes a sync pattern on the basis of the period N2.

The shutter-glasses controller 240 selects the second operation mode on the basis of an analysis result, and restores the omitted sync pulses P2, P4, P5, and P6 to thereby generate the ON/OFF signal.

The shutter-glasses controller 240 may determine whether the sync signal is normal or whether there is noise on the basis of a sync pulse width of the sync signal when the shutter-glasses communication unit 210 receives the second sync signal or the third sync signal. That is, the shutter-glasses controller 240 determines the corresponding sync pulse is abnormal if the sync pulse width of the received sync signal is not a preset value, and makes an analysis on the basis of a normal sync pulse.

Such an analysis may be derived by analyzing a pattern of a sync pulse during a predetermined period of time.

Also, the shutter-glasses controller 240 monitors a change in a waveform of a sync signal received in the shutter-glasses communication unit 210, such as a change in a sync pattern of a sync pulse in real time. When sensing a change in the waveform of the received sync signal, the shutter-glasses controller 240 may analyze the changed waveform and control the shutter glasses 200 to operate in an operation mode corresponding to the analyzed waveform.

The sync pulses of the sync signal corresponding to the display timing of the video frame may be implemented by a variety of methods, as described in detail below with reference to FIG. 4.

Figure 4:
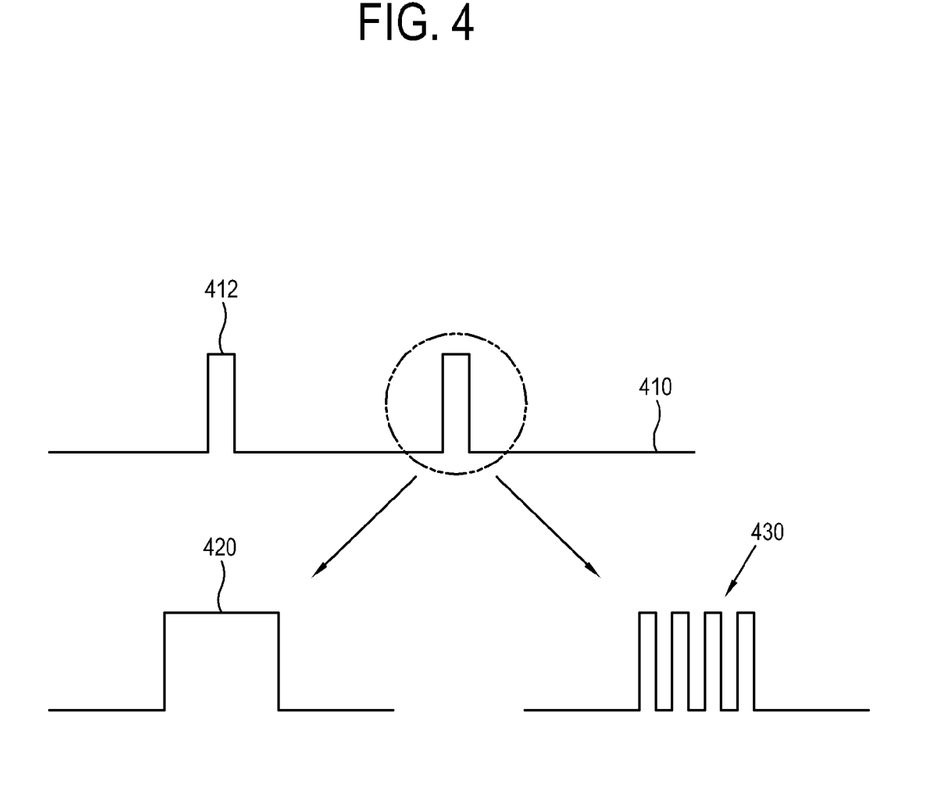
FIG. 4 shows an example of sync pulses of the sync signal.

FIG. 4 shows an example of sync pulses of the sync signal.

As shown in FIG. 4, a sync signal 410 has sync pulses 412, each respectively corresponding to a video frame in time. Each sync pulse 412 may be an enable signal 420 or a plurality of carrier pulses 430.

If the sync signal received in the shutter-glasses communication unit 210 has a pattern where the plurality of carrier pulses is periodically repeated, the shutter-glasses controller 240 analyzes the pattern of carrier pulses and restores the omitted carrier pulses, thereby selecting a corresponding operation mode.

For example, a plurality of the carrier pulses may include a number of pulses such as 1, 2, 3, 4, 5, 6, etc. In an exemplary embodiment, the number of pulses is 2 to 5.

The shutter-glasses controller 240 adjusts an ON-duty width of the ON/OFF signal and controls operation based on the adjusted ON/OFF signal, thereby controlling the light transmittance of the left-eye lens unit 220 and the right-eye lens unit 230. However, this is only an example which does not restrict an exemplary embodiment.

A control method for the display apparatus 100 according to an exemplary embodiment is described in detail below with reference to FIG. 5.

Figure 5:
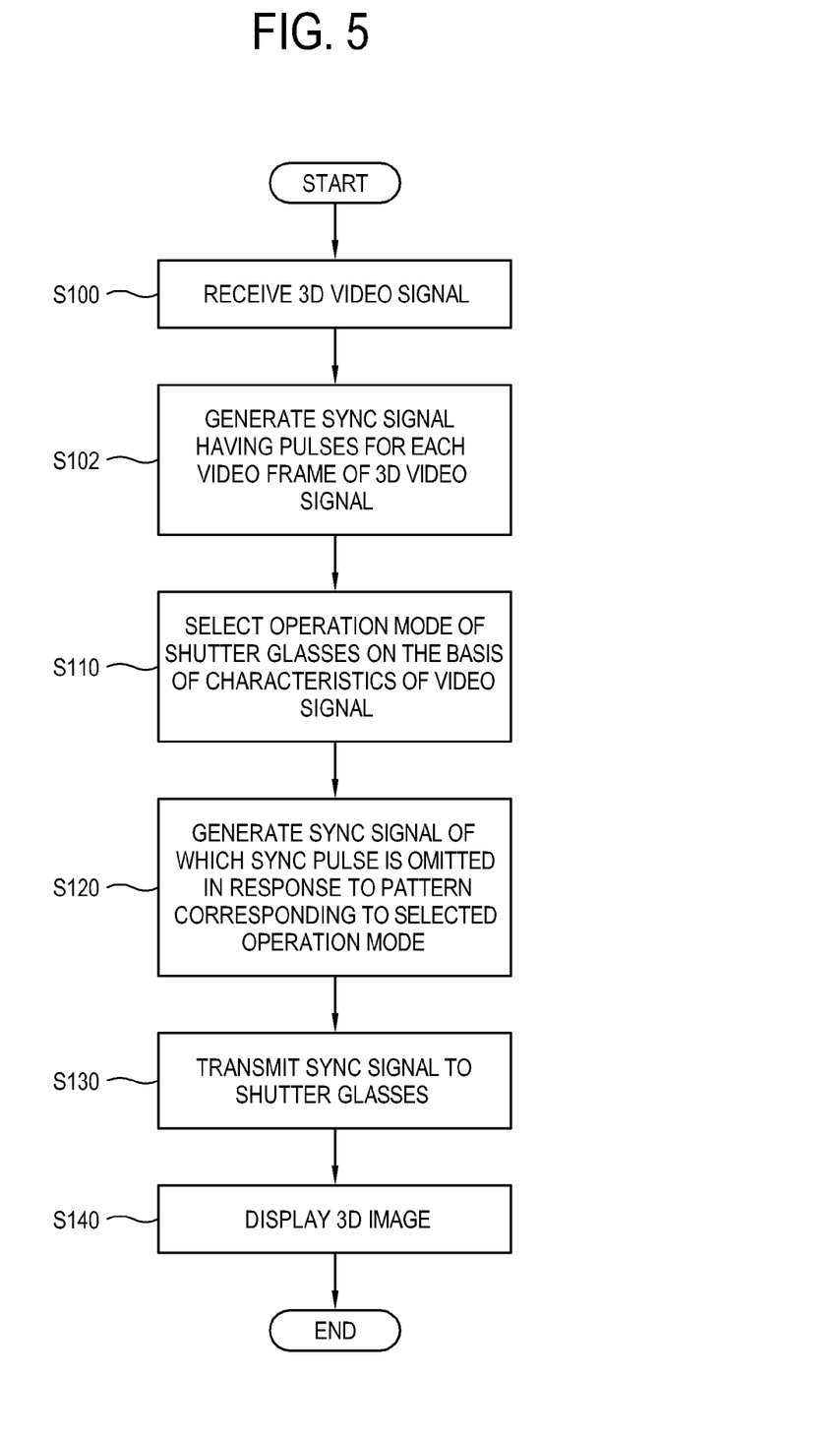
FIG. 5 shows a flowchart of controlling a display apparatus.

As shown in FIG. 5, a 3D video signal is received in the display apparatus 100 at operation S100. The signal generator 140 generates a first sync signal having sync pulses corresponding to each video frame of the video signal at operation S102. The display-apparatus controller 160 selects the operation mode of the shutter glasses 200 on the basis of the characteristics of the received video signal at operation S110.

The display-apparatus controller 160 generates a second sync signal in which sync pulses are omitted, from the first sync signal on the basis of the pattern corresponding to the selected operation mode at operation S120.

The display-apparatus controller 160 transmits the second sync signal generated at the operation S120 to the shutter glasses 200 at operation S130, and displays a 3D image based on a 3D video signal at operation S140.

A control method for the shutter glasses 200 according to an exemplary embodiment is described in detail below with reference to FIG. 6.

Figure 6:
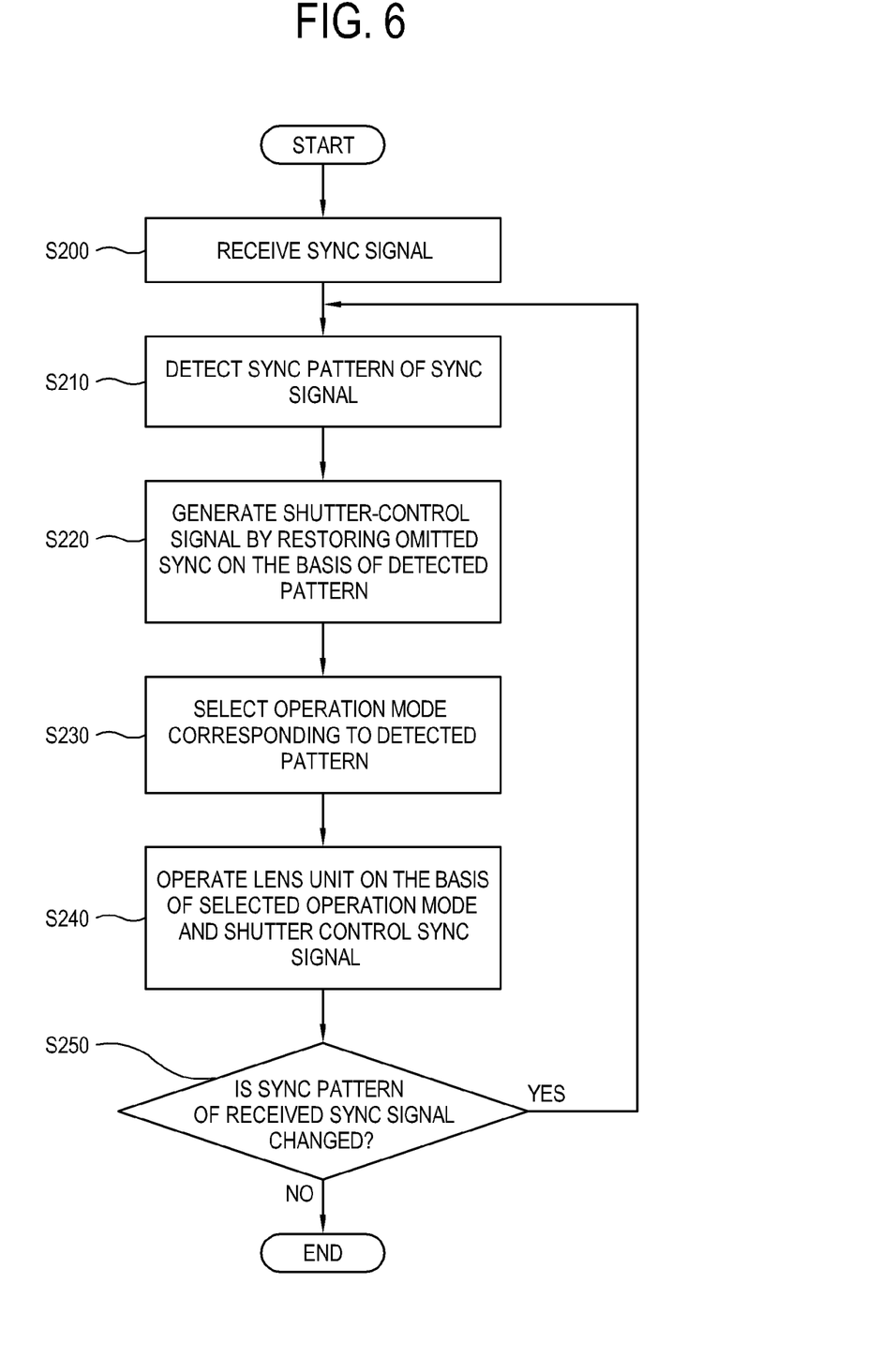
FIG. 6 shows a flowchart of controlling the shutter glasses.

As shown in FIG. 6, the second sync signal from the display apparatus 100 is received at operation S200. The shutter-glasses controller 240 detects a sync pattern of the received sync signal at operation S210.

On the basis of the detected pattern, the shutter-glasses controller 240 restores the omitted sync pulse to generate a shutter-control sync signal at operation S220 and selects the operation mode corresponding to the detected pattern at operation S230.

The shutter-glasses controller 240 operates the left-eye lens unit 220 and the right-eye lens unit 230 on the basis of the selected operation mode and the shutter-control sync signal at operation S240.

The shutter-glasses controller 240 monitors a change in the sync pattern of the received sync signal. If the sync pattern of the sync signal is changed at operation S250, operations S220-S240 are performed to operate the left-eye lens unit 220 and the right-eye lens unit 230.

As described above, the sync pulses of the sync signal transmitted from the display apparatus 100 to the shutter glasses 200 may be partially omitted according to the preset pattern and transmitted, so that interference with other communication devices and a system load can be decreased, thereby minimizing effects of noise, by lowering the frequency of the sync signal.

Also, the shutter glasses 200 restores the omitted sync pulses in the received sync signal on the basis of the preset pattern, thereby minimizing erroneous readings when some pulses are not received due to a communication error.

Further, the patterns of the sync pulses respectively correspond to the plurality of operation modes for the shutter glasses 200, so that the operation mode can be selected according to the patterns of the sync signal even though the transmitted sync signal has no separate code or data. Thus, the sync signal can have a simple configuration.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. Shutter glasses for a display apparatus, the shutter glasses comprising:
a shutter-glasses communication unit configured to receive a first sync signal from the display apparatus displaying a three-dimensional (3D) image; and
a shutter-glasses controller configured to convert the first sync signal into a second sync signal and configured to generate a driving signal for a left-eye lens unit and a right-eye lens unit of the shutter glasses based on the second sync signal,
wherein the first sync signal is generated in the display apparatus by omitting at least one sync pulse in the second sync signal cording to a predetermined pattern so that a frequency of the first sync signal is reduced while being transmitted from the display apparatus to the shutter glasses, and the second sync signal comprises a plurality of sync pulses and is generated corresponding to the 3D image, and
wherein the shutter-glasses controller converts the first sync signal into the second sync signal by restoring the omitted sync pulse from the first sync signal according to the predetermined pattern.

2. The shutter glasses according to claim 1, wherein the shutter-glasses controller controls the driving signal to adjust light transmittance of the left-eye lens unit and the right-eye lens unit based on the pattern.

3. The shutter glasses according to claim 2, wherein the light transmittance is adjusted depending on a duty width of the driving signal for the left-eye lens unit and the right-eye lens unit.

4. The shutter glasses according to claim 1, wherein the first sync signal comprises a pattern in which a plurality of carrier pulses is periodically repeated.

5. The shutter glasses according to claim 4, wherein the plurality of carrier pulses comprises from two to five consecutive carrier pulses.

6. The shutter glasses according to claim 1, wherein the shutter-glasses controller determines whether the first sync signal is normal or whether there is noise based on a sync pulse width of the first sync signal.

7. Shutter glasses for a display apparatus, the shutter glasses comprising:
a shutter-glasses communication unit which communicates with the display apparatus and receives a first sync signal;
a lens unit which operates to selectively transmit light; and
a shutter-glasses controller configured to convert the first sync signal into a shutter-control sync signal, in which at least one sync pulse corresponding to timing of displaying a three-dimensional (3D) image in the display apparatus is corrected, based on a waveform of the first sync signal, and operates the lens unit based on the shutter-control sync signal,
wherein the first sync signal is generated in the display apparatus by omitting the at least one sync pulse in the shutter-control sync signal according to a predetermined pattern so that a frequency of the first sync signal is reduced while being transmitted from the display apparatus to the shutter glasses, and the shutter-control sync signal comprises a plurality of sync pulses and is generated corresponding to the 3D image.

8. The shutter glasses according to claim 7, wherein the first sync signal comprises the waveform in which at least one sync pulse is omitted according to a preset sync pattern from the sync pulses corresponding to the timing of displaying the 3D image, and
wherein the shutter-glasses controller analyzes the waveform of the first sync signal and converts the first sync signal into the shutter-control sync signal by restoring the omitted sync pulse based on the analyzed waveform.

9. The shutter glasses according to claim 8, wherein a plurality of sync pulses of the first sync signal is omitted from the sync pulses corresponding to timing of displaying frames of the 3D image comprising a left-eye image field and a right-eye image field, or corresponding to timing of displaying the left-eye field and the right-eye field.

10. The shutter glasses according to claim 8, wherein a plurality of preset sync patterns is set in advance, and
the shutter-glasses controller selects the preset sync pattern corresponding to the first sync signal from the plurality of preset sync patterns when converting the first sync signal into the shutter-control sync signal.

11. The shutter glasses according to claim 8, wherein the shutter-glasses controller selects an operation mode corresponding to the preset sync pattern of the first sync signal among operation modes for operating the lens unit, and operates the lens unit in the selected operation mode based on the shutter-control sync signal.

12. The shutter glasses according to claim 11, wherein the operation modes are categorized according to light transmittances of the lens unit.

13. The shutter glasses according to claim 11, wherein the shutter-glasses controller monitors a change in the waveform of the first sync signal received in the shutter-glasses communication unit, and implements the operation mode corresponding to the change in the waveform.

14. The shutter glasses according to claim 13, wherein the shutter-glasses controller implements the operation mode in real time corresponding to the change in the waveform.

15. A display apparatus comprising:
a video receiver which receives a video signal;
a video processor which processes the video signal received in the video receiver to be displayed as an image;
shutter glasses;
a display unit which displays the video signal processed by the video processor as a three dimensional (3D) image;
a display-apparatus communication unit which communicates with the shutter glasses; and
a display-apparatus controller which generates a first sync signal having a waveform when displaying the 3D image on the display unit, and transmits the first sync signal to the shutter glasses through the display-apparatus communication unit,
wherein the shutter glasses convert the first sync signal into a shutter-control sync signal, in which at least one sync pulse corresponding to timing of displaying the 3D image in the display apparatus is corrected, based on the waveform, and operate based on the shutter-control sync signal, and
wherein the display-apparatus controller generates the first sync signal by omitting the at least one sync pulse signal in the shutter-control sync signal according to a predetermined pattern so that a frequency of the sync signal is reduced while being transmitted from the display apparatus to the shutter glasses.

16. The display apparatus according to claim 15, wherein the first sync signal comprises the waveform in which some sync pulses are omitted depending on a preset sync pattern from the sync pulses corresponding to timing of displaying the 3D image.

17. The display apparatus according to claim 16, wherein the sync pulses of the first sync signal are omitted from the sync pulses corresponding to timing of displaying frames of the 3D image comprising a left-eye image field and a right-eye image field, or corresponding to timing of displaying the left-eye field and the right-eye field.

18. The display apparatus according to claim 16, wherein a plurality of sync patterns is provided, and
the display-apparatus controller selects one of the plurality of sync patterns when generating the first sync signal.

19. The display apparatus according to claim 18, wherein the display-apparatus controller selects an operation mode from operation modes for operating the shutter glasses based on characteristics of a video signal received, and selects the sync pattern corresponding to the selected operation mode.

20. The display apparatus according to claim 19, wherein the operation modes are categorized according to light transmittances of the lens unit.

21. The display apparatus according to claim 19, wherein the display-apparatus controller selects the operation mode according to respective time periods of the first sync signal corresponding to the timing of displaying the 3D image.

22. A method of controlling shutter glasses for a display apparatus, the method comprising:
receiving, from the display apparatus, a first sync signal having a waveform;
converting the first sync signal into a shutter-control sync signal, in which at least one sync pulse corresponding to timing of displaying a three-dimensional (3D) image in the display apparatus is corrected, based on the waveform; and
operating lens unit of the shutter glasses based on the shutter-control sync signal,
wherein the first sync signal is generated in the display apparatus by omitting the at least one sync pulse signal in the shutter-control sync signal according to a predetermined pattern so that a frequency of the first sync signal is reduced while being transmitted from the display apparatus to the shutter glasses.

23. The method according to claim 22, wherein the first sync signal comprises the waveform in which some sync pulses are omitted depending on a preset sync pattern, from the sync pulses corresponding to timing of displaying the 3D image, and
the converting the first sync signal into the shutter-control sync signal comprises:
analyzing the waveform from the first sync signal; and
restoring the omitted sync pulses of the first sync signal based on the analyzed waveform.

24. The method according to claim 23, wherein the sync pulses of the first sync signal are omitted from the sync pulses corresponding to timing of displaying frames of the 3D image comprising a left-eye image field and a right-eye image field, or corresponding to timing of displaying the left-eye field and the right-eye field.

25. The method according to claim 23, wherein the analyzing the waveform comprises selecting sync pattern corresponding to the first sync signal from a plurality of sync patterns.

26. The method according to claim 25, wherein the selecting the sync pattern comprises selecting an operation mode corresponding to the sync pattern from a plurality of operation modes for operating the lens unit, and
the operating the lens unit based on the shutter-control sync signal comprises operating the lens unit in the selected operation mode.

27. The method according to claim 26, wherein the plurality of operation modes is categorized according to light transmittances of the lens unit.

28. The display apparatus according to claim 26, wherein the selecting the operation mode comprises monitoring a change in the waveform of the first sync signal received from the display apparatus, and
the operating the lens unit in the selected operation mode comprises operating the lens unit in the operation mode corresponding to the change in the waveform.

29. A method of controlling a display apparatus, the method comprising:
displaying a three-dimensional (3D) image;

generating a first sync signal having a waveform corresponding to display of the 3D image; and transmitting the first sync signal to shutter glasses, wherein the first sync signal is generated in the display apparatus by omitting at least one sync pulse in a shutter-control sync signal according a predetermined pattern so that a frequency of the first sync signal is reduced while being transmitted from the display apparatus to the shutter glasses, and wherein the shutter glasses convert the first sync signal into the shutter-control sync signal, in which the omitted sync pulse corresponding to timing of displaying the 3D image is corrected, based on the waveform, and operate based on the shutter-control sync signal.

30. The method according to claim 29, wherein the first sync signal comprises the waveform in which sync pulses are omitted depending on a preset sync pattern, from the sync pulses corresponding to timing of displaying the 3D image.

31. The method according to claim 30, wherein the sync pulses of the first sync signal are omitted from the sync pulses corresponding to timing of displaying frames of the 3D image comprising a left-eye image field and a right-eye image field, or corresponding to timing of displaying the left-eye field and the right-eye field.

32. The method according to claim 30, wherein the generating the first sync signal comprises selecting one of a plurality of sync patterns.

33. The method according to claim 32, wherein the selecting one of the plurality of sync patterns comprises:

selecting one of operation modes for operating the shutter glasses based on characteristics of a video signal received in the display apparatus; and selecting the sync pattern corresponding to the selected operation mode.

34. The method according to claim 33, wherein the operation modes are categorized according to light transmittances of the lens unit.

35. The display apparatus according to claim 33, wherein the selecting one of the operation modes comprises selecting the operation mode according to respective sync periods corresponding to timing of displaying the 3D image.

36. A method comprising:

generating a first sync signal corresponding to displaying frames of a three-dimensional (3D) image in a display device;

determining a preset sync pattern corresponding to an operation mode of shutter glasses;

converting the first sync signal into a second sync signal by omitting at least one sync pulse from the first sync signal, based on the determined preset sync pattern;

transmitting the second sync signal to the shutter glasses;

restoring the first sync signal by restoring the omitted sync pulses in the second sync signal received by the shutter glasses; and controlling the shutter glasses based on the restored first sync signal, wherein the first sync signal is generated in the display device by omitting the at least one sync pulse in the second sync signal according to a predetermined pattern so that a frequency of the first sync signal is reduced while being transmitted from the display apparatus to the shutter glasses.

37. The method of claim 36, wherein the converting comprises:

storing, in advance, a plurality of preset sync patterns in the shutter glasses;

analyzing a waveform of the second sync signal; and matching the waveform of the second sync signal with one of the stored preset sync patterns.

38. The method of claim 37, wherein the controlling comprises:

storing, in advance, a plurality of operation modes of the shutter glasses;

selecting one of the stored operation modes, based on the preset sync pattern which matches the waveform; and controlling the shutter glasses based on the restored first sync signal to adjust light transmittance of a left-eye lens unit and a right-eye lens unit of the shutter glasses based on the selected operation mode.

* * * * *